Patented Nov. 21, 1922.

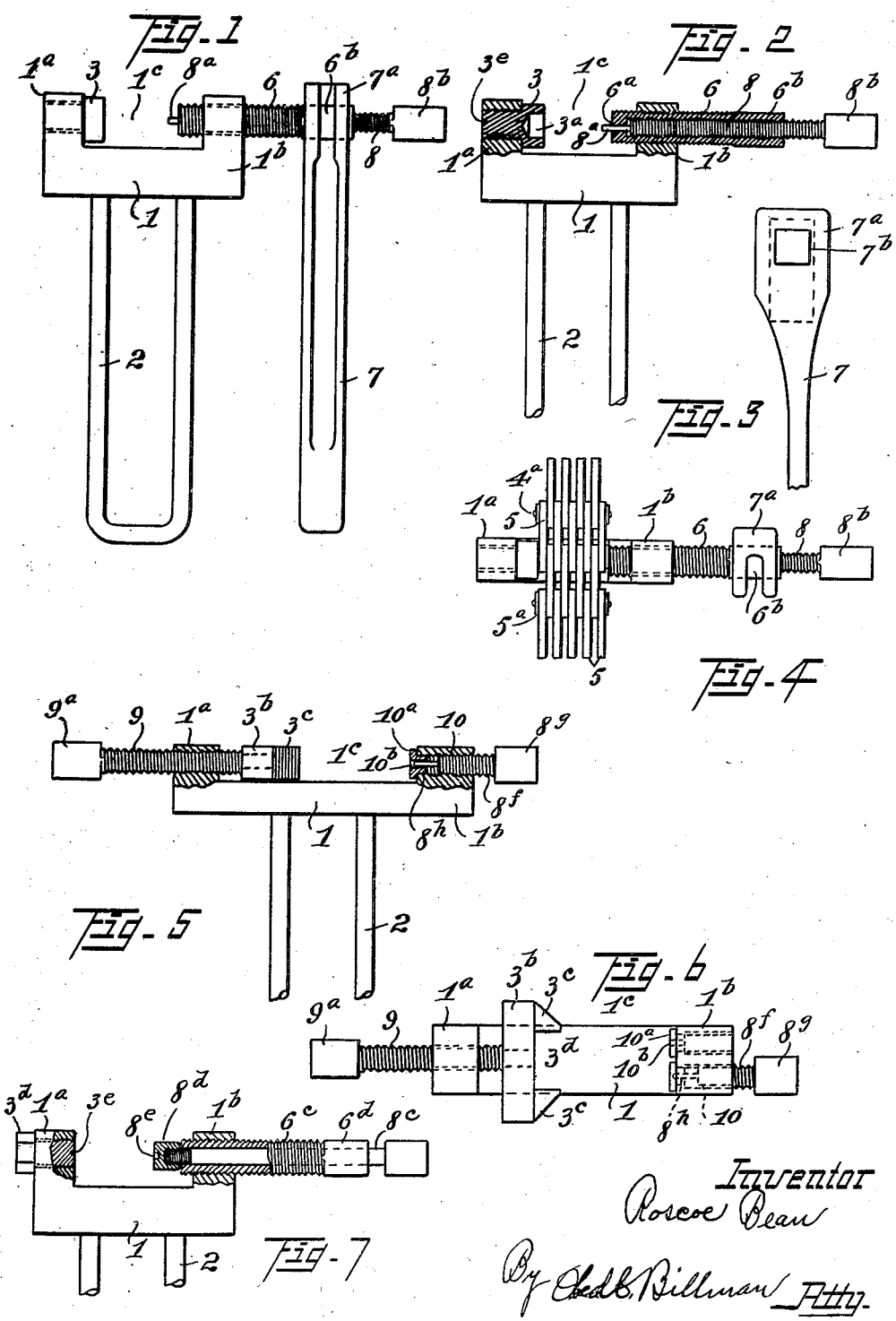

1,436,429

UNITED STATES PATENT OFFICE.

ROSCOE BEAN, OF BEREA, OHIO.

CHAIN TOOL.

Application filed June 28, 1920. Serial No. 392,490.

*To all whom it may concern:*

Be it known that I, ROSCOE BEAN, a citizen of the United States, residing at Berea, in the county of Cuyahoga and State of Ohio, have invented certain new and useful Improvements in Chain Tools, of which the following is a specification.

My invention relates to improvements in chain tools, the present embodiment of the invention being particularly designed and adapted for use in connection with modern chains employing a plurality of links connected by a series of rivets.

The present invention is particularly designed and adapted for removing and reinserting and reheading such rivets of such chains in connection with the removal and insertion of chain links in the repair or readjustment of such chains.

The primary object of the invention is the provision of a generally improved tool of this class which will be exceedingly simple in construction, cheap of manufacture, and efficient in use.

A further and very important object is the provision of a tool of this class having properly formed and arranged heads and chain link clamping and rivet engaging and ejecting devices adapted to initially receive the links of the chain to securely hold the same while the rivet is being ejected by the rivet ejecting device or plunger.

A still further object is the provision of an improved tool having an anvil and link clamping device provided at one side with a rotatable head, said link clamping device being provided with a rotatable rivet engaging member provided with a second operating head together with an operating handle or wrench for the operation of said link clamping and rivet engaging and ejecting or reheading members (as the case may be) by the successive operation of said operating heads of said tool.

With the above mentioned and other ends in view, the invention consists in the novel construction, arrangement, and combination of parts, hereinafter described, illustrated in some of its embodiments in the accompanying drawings, and particularly pointed out in the appended claims.

Referring to the drawings, forming a part of this specification, Figure 1 is a side elevation of a chain tool constructed in accordance with this invention, the link clamping device being provided with the interchangeable tool handle or wrench, and the rivet ejecting device being in its advanced or projected position after ejecting a rivet from the links of the chain.

Fig. 2, a view partly in side elevation and partly in section, the tool handle being removed.

Fig. 3, a side elevation of the improved tool or operating handle removed.

Fig. 4, a top plan view of the same in operative engagement with the links of a chain and the rivet to be ejected, and preparatory to the actuation of the rivet ejecting device or plunger.

Fig. 5, a side elevation, partly in section, of a modified form of tool adapted to simultaneously clamp and engage a pair of rivets, a modified form of anvil movable for initially engaging and clamping the side links being shown.

Fig. 6, a top plan view of the same.

Fig. 7, a side elevation of the same equipped with a rotatably mounted rivet engaging member in the specific form of a rivet reheader.

Similar numerals of reference designate like parts throughout all the figures of the drawings.

The improved tool comprises a suitable block 1, provided with spaced heads $1^a$ and $1^b$, respectively, forming an intermediate chain receiving recess $1^c$.

The head block 1, is preferably provided with a handle 2, and the head $1^a$ is provided with an anvil 3, having a rivet receiving recess $3^a$. The recess $3^a$ is preferably sufficiently large to receive the head $4^a$, of the rivet 4, and also the washer $5^a$, of the chain links 5, as will be obvious upon reference to Fig. 4 of the drawings.

The anvil 3, is preferably mounted in a suitable opening of the head $1^a$, as shown in Figs. 1, 2 and 4 of the drawings, and in such instance is provided with a rounded rivet head and washer receiving recess, but if desired, the anvil may comprise a transverse block $3^b$, provided with forwardly extending jaws or projections $3^c$, adapted to extend on opposite sides of a pair of rivets and to engage directly with the side links.

as shown most clearly in Figs. 5 and 6 of the drawings.

In this form the jaws form an intervening space or recess 3<sup>d</sup>, for receiving the adjacent heads or ends of the rivets as successively ejected as hereinafter described, this form being particularly designed for a type of chain in which the heads of the rivets are arranged directly against the side links instead of upon intervening washers, as shown in Fig. 4 of the drawings.

The chain link clamping device is preferably in the form of an externally threaded member 6, provided at one end with a rivet head receiving recess 6<sup>a</sup>, and at the other end with an operating head 6<sup>b</sup>, the latter being preferably angular for suitable operation by a tool handle 7, said tool handle 7 being provided with a head 7<sup>a</sup>, having an angular opening 7<sup>b</sup>, adapted to fit upon the angular head 6<sup>b</sup>, for operating the clamping member 6. The chain link clamping member 6, is threaded in a threaded opening in the head 1<sup>b</sup>, and is provided with a threaded bore terminating in the rivet head receiving recess 6<sup>a</sup>, said threaded bore being adapted to removably receive and contain a rivet ejecting plunger 8, said plunger terminating in a rivet ejecting pin 8<sup>a</sup>, the latter filling the rivet head receiving recess 6<sup>a</sup>. The outer end of the threaded plunger member 8, is provided with an operating head 8<sup>b</sup>, corresponding in form and size to the head 6<sup>b</sup>, of the chain link clamping member 6, so that the tool handle 7, may be used interchangeably on the operating heads 6<sup>b</sup> and 8<sup>b</sup>.

When it is desired to remove a rivet from a chain, the links of the latter are placed between the anvil and clamping members 3 and 6, respectively, so that the heads of the rivet are received in the recesses 3<sup>a</sup>, and 6<sup>a</sup>, respectively, and the overlapping portions of the links 5, are drawn up so as to take up the slack or play therebetween and securely seat the heads of the rivets in the head receiving recesses of the opposing anvil and clamping members. The rivet is then ejected by transferring the head 7<sup>a</sup>, of the tool handle 7, upon the operating head 8<sup>b</sup>, of the rivet ejecting device, and by drawing up on the same the edges of the adjacent rivet head will be stripped off and the body of the rivet ejected.

When it is desired to rehead the rivet, the latter after being placed in the overlapping links may be placed in the tool head and the clamping member 6, be replaced with a modified form of threaded link clamping member 6<sup>c</sup>, having an operating head 6<sup>d</sup>, as shown in Fig. 7 of the drawings, and in which instance a modified form of rivet engaging member is used, such rivet engaging member comprising a rotatable member 8<sup>c</sup>, having a relatively fixed head 8<sup>d</sup>, the latter having a conical recess 8<sup>e</sup>, adapted to receive the end of the rivet and upset the latter as the member 8<sup>e</sup> and head 8<sup>d</sup> carried thereby are rotated, and as the clamping device 6<sup>c</sup> is fed forwardly at intervals. In this form it will be seen that the anvil 3, is reversed from the position shown in Figs. 1, 2 and 4 of the drawings, bringing the opposite side of the anvil into use, such side being provided with a tapered rivet receiving and holding recess 3<sup>c</sup>, adapted to engage and hold the end or head of the rivet and prevent the same from rotating or turning in the upsetting and reheading operations by the rotatable member 8<sup>c</sup>, and in some instances the anvil may be turned and operated as a rivet upsetting and reheading device by rotating the same through the medium of the angular head 3<sup>d</sup>, provided for such purpose.

In the form shown in Figs. 5 and 6 of the drawings, the anvil 3<sup>b</sup>, is movable through the clamping screw 9, provided with the operating head 9<sup>a</sup>, and the head 1<sup>b</sup>, is provided with a pair of threaded openings 10, terminating in link clamping heads 10<sup>a</sup>, the latter being provided with rivet head receiving recesses 10<sup>b</sup>. In this form the threaded openings 10, are adapted to receive a plunger 8<sup>f</sup>, having a head 8<sup>g</sup>, and terminating in a rivet ejecting pin 8<sup>h</sup>. In this form the block 3<sup>b</sup> may be moved to take up the looseness or slack between the links and in bringing the heads of the rivets in seated position in the rivet head receiving recesses 10<sup>b</sup>, and after the rivet is ejected at one side or end of the overlapping links, the plunger 8<sup>f</sup> may be removed and placed in the next threaded opening and the other rivet removed.

Having thus described some of the embodiments of my invention, without having attempted to set forth all the forms in which it may be made, or all the modes of its use, what I claim and desire to secure by Letters Patent, is,—

1. In a chain tool, the combination with a block carrying an anvil member and a link clamping member, one of said members being adjustable and having a rivet head receiving recess; of a rivet engaging member rotatable in one of said members and adapted to be held by the latter while holding said links in position.

2. In a chain tool, the combination with an anvil member and a clamping member cooperating therewith and provided with an operating head; of a rivet treating member rotatable in one of said members and provided at one side with a rivet head engaging member and at the other with an operating head adjacent said first mentioned operating head, and an operating handle for said operating heads.

3. In a chain tool, the combination with an anvil having a rivet head receiving recess, and an adjustable clamping device cooperaing therewith and provided with an operating head; of a rivet treating member rotatable therein and provided at one side with a rivet head engaging member and at the other with an operating head adjacent to the operating head of said link clamping device, and an operating handle adapted to operate either of said operating heads.

4. In a chain tool, the combination with a block carrying an anvil member at one side and adjustable link clamping member at the other, one of said members having a rivet head receiving recess; of a rivet engaging member rotatable in one of said members and adapted to be operated on the rivet while the links are clamped between said anvil and clamping members and the rivet is held in said rivet head receiving recess.

5. A chain tool, comprising a block provided with spaced heads, an anvil having a rivet head receiving recess, an adjustable link clamping device opposite said anvil having a rivet head receiving and guiding recess, and a rivet ejecting plunger in said clamping device adjustable in said rivet head receiving and guiding recess and provided with an operating head at the side of said block.

6. A chain tool, comprising a block provided with spaced heads forming an intermediate chain receiving recess, an anvil in one head having a rivet head receiving recess, a chain link clamping screw in the opposite head having a rivet head receiving and guiding recess, and a rivet ejecting plunger adjustable in the latter and having an operating head projecting from said last mentioned head.

7. A chain tool, comprising a block provided with spaced heads including an anvil having a rivet head receiving recess, an adjustable link clamping device opposite said anvil having a rivet head receiving recess, a plunger adjustable in said clamping device and provided with a rivet ejecting stem filling said rivet head receiving recess and provided with an operating head at the side of said block.

8. A chain tool, comprising a handled block provided with spaced heads forming an intermediate chain receiving recess, an anvil having a rivet head receiving recess, a chain link clamping device opposite said anvil having a rivet head receiving recess at one end and an operating head at the other, a rivet ejecting plunger adjustable in said link clamping device having an operating head, and a tool handle interchangeable with said operating heads.

9. A chain tool, comprising a handle provided at its top with spaced heads, an anvil having a rivet head receiving recess, a chain link clamping device adjustable toward said anvil and provided with a rivet head receiving recess, and a rivet ejecting plunger in said link clamping device having a rivet ejecting head operable in said recess, and a handle removable on the head of said clamping device and interchangeable with said rivet ejecting plunger.

10. A chain tool, comprising a handle provided at its top with spaced heads, an anvil having a rivet head receiving recess, a chain link clamping device adjustable toward said anvil and having an operating head at one end and provided with a rivet head receiving recess at the other, a rivet engaging member rotatable in said link clamping device having an operating head adjacent said operating head of said clamping device, and a handle on the head of said clamping device and interchangeable with the operating head of said rivet engaging member.

11. A chain tool, comprising a block carrying an anvil having a rivet head receiving recess and a link clamping device in cooperative relation therewith terminating in an angular head, said clamping device being provided with a threaded opening terminating in a rivet head receiving and guiding recess, a threaded member in said threaded opening terminating at one end in a rivet ejecting plunger operable in said rivet head receiving and guiding recess and at the other end in an angular head adjacent said angular head of said link clamping device, and an operating handle provided with an angular recess interchangeable with said angular heads for operating said link clamping and rivet ejecting members.

12. A chain tool, comprising a block having a rivet head receiving recess and a link clamping device in co-operative relation therewith terminating in an operating head at one side of said block, said clamping device being provided with a threaded opening terminating in a rivet head receiving recess, a threaded member in said threaded opening terminating at one end in a rivet ejecting plunger operable in said rivet head receiving and guiding recess and at the other end in an operating head adjacent said operating head of said link clamping device, and an operating handle interchangeable with said operating heads of said link clamping and rivet ejecting members.

13. In a chain tool, a chain link engaging and slack taking up device having a rivet receiving recess and an operating head and a rivet engaging member movable relatively therein.

14. In a chain tool, a chain link engaging device having a rivet head receiving recess and an operating head, a rivet engaging member rotatable therein and provided with an operating head, and a tool handle interchangeable with said operating heads.

15. In a chain tool, the combination with an anvil provided with a recess adapted to receive the head of a rivet and to engage the adjacent side of the chain link; of a link clamping member having a rivet head receiving recess and adapted to co-operate with said anvil, one of said members being adjustable toward the other for initially engaging and taking up the slack between the chain links.

16. In a tool for chains embodying a plurality of riveted overlapping side links, the combination with an anvil provided with a recess adapted to receive the head and washer of a rivet and to engage the adjacent side of a chain link; of a link clamping member having a rivet head receiving recess, one of said members being adjustable toward the other for initially engaging and taking up the slack between said chain side links.

17. In a chain tool, the combination with spaced anvil and link clamping members adapted to receive the links of the chain therebetween and having rivet receiving recesses, one of said members being adjustable relative to the other to initially engage and take up the slack in the links therebetween, and a rivet engaging member movable relatively while the links are being held.

18. In a chain tool, the combination with spaced anvil and link clamping members adapted to receive the links of the chain therebetween and having rivet head receiving recesses, one of said members being adjustable relative to the other to initially engage and take up the slack in the links therebetween, and a rivet engaging member movable in one of said members while the links are being held in relatively fixed position.

In testimony whereof I have affixed my signature.

ROSCOE BEAN.